UNITED STATES PATENT OFFICE.

SIMON S. MYERS, OF PHILADELPHIA, PENNSYLVANIA.

PROCESS OF PREPARING FOOD FOR POULTRY.

SPECIFICATION forming part of Letters Patent No. 321,909, dated July 7, 1885.

Application filed January 31, 1885. (No specimens.)

*To all whom it may concern:*

Be it known that I, SIMON S. MYERS, a citizen of the United States, residing in the city and county of Philadelphia, State of Pennsylvania, have invented a new and useful Improvement in Preparing Egg-Food for Poultry, which improvement is fully set forth in the following specification.

The object of my invention is to provide food for hens or chickens and other poultry whereby they are kept in healthy condition and caused to lay eggs of good quality and in greater quantities or oftener than heretofore.

In carrying out my invention I take granulated oyster-shells, and after bolting or screening the same so that they are of about uniform size, I saturate them with tincture of capsicum. The tincture is then ignited, thus burning off the spirits or alcohol, roasting the grains of shell, the capsicum remaining therewith and destroying the eyes and other remaining particles of the oysters and objectionable matters of the shell, the grains being also thoroughly dried, after which the product may be packed or sold in bulk, and is ready for use.

The food as prepared will be found serviceable for hens, in that it is of easily-digestible nature, the grains of the shell owing to roasting being relieved of their density and thus made lighter. It is of a spiced nature, hence palatable, healthy, and a preventive of disease. It is invigorating for producing egg-shells, and causing hens to lay more frequently, the eggs being of better quality and adapted to be kept good for a longer period of time.

While capsicum is preferred, any other suitable spice may be employed in lieu thereof.

I am aware that it is not new to use either lime or capsicum as food for poultry, and such I do not claim.

Having thus described my invention, what I claim as new, and desire to secure by Letters Patent, is—

The process of preparing an egg-food for poultry, consisting in granulating oyster-shells, the same being then saturated with tincture of capsicum, and finally roasted, substantially as described.

SIMON S. MYERS.

Witnesses:
JOHN A. WIEDERSHEIM,
A. P. GRANT.